United States Patent [19]
Tanaka

[11] Patent Number: 6,014,365
[45] Date of Patent: Jan. 11, 2000

[54] DISC CARTRIDGE AND INDICATION LABEL FOR THE SAME

[75] Inventor: Satoshi Tanaka, Yokohama, Japan

[73] Assignee: Kabushiki Kaisha Toshiba, Kawasaki, Japan

[21] Appl. No.: 08/730,294

[22] Filed: Oct. 11, 1996

[30] Foreign Application Priority Data

Oct. 13, 1995 [JP] Japan .................................. 7-265860

[51] Int. Cl.⁷ .............................. G11B 3/70; G11B 23/03
[52] U.S. Cl. ............................................ 369/291; 360/133
[58] Field of Search ........................... 369/291; 360/133, 360/132; 206/444, 308.1, 308.3

[56] References Cited

U.S. PATENT DOCUMENTS

| | | | |
|---|---|---|---|
| 3,500,364 | 3/1970 | David et al. | 206/308.3 |
| 4,476,978 | 10/1984 | Saito | 206/444 |
| 4,618,061 | 10/1986 | Rubenfeld | 206/444 |
| 4,737,876 | 4/1988 | Brock et al. | 360/133 |
| 4,805,061 | 2/1989 | Champagne et al. | 360/133 |
| 4,837,652 | 6/1989 | Kerby | 360/133 |
| 4,843,511 | 6/1989 | Downey | 360/133 |
| 5,041,923 | 8/1991 | Iwata et al. | 360/60 |
| 5,121,380 | 6/1992 | Fujita et al. | 369/291 |
| 5,150,269 | 9/1992 | Iwaki et al. | 360/133 |
| 5,150,354 | 9/1992 | Iwata et al. | 369/291 |
| 5,293,293 | 3/1994 | Iwata et al. | 360/133 |
| 5,325,256 | 6/1994 | Miyazaki et al. | 360/132 |
| 5,417,324 | 5/1995 | Joyce et al. | 206/310 |
| 5,421,950 | 6/1995 | Parrish | 156/579 |
| 5,499,233 | 3/1996 | Childers et al. | 369/291 |
| 5,526,342 | 6/1996 | Akiyama et al. | 369/291 |
| 5,539,600 | 7/1996 | Lee et al. | 360/133 |

FOREIGN PATENT DOCUMENTS

| | | |
|---|---|---|
| 0 260 876 | 3/1988 | European Pat. Off. . |
| 0 332 214 | 9/1989 | European Pat. Off. . |
| 0 335 461 | 10/1989 | European Pat. Off. . |
| 0 368 347 | 5/1990 | European Pat. Off. . |
| 0 421 775 | 4/1991 | European Pat. Off. . |
| 0 473 846 | 3/1992 | European Pat. Off. . |
| 61-137290 | 6/1986 | Japan ..................................... 360/133 |
| 2 081 959 | 2/1982 | United Kingdom . |
| 93 20547 | 10/1993 | WIPO . |

*Primary Examiner*—William J. Klimowicz
*Assistant Examiner*—Kenneth W. Fields
*Attorney, Agent, or Firm*—Pillsbury Madison & Sutro LLP

[57] ABSTRACT

A cartridge body for storing an optical disc includes a pair of main surfaces, a plurality of side end surfaces continuous to the pair of main surfaces, and a disc inlet/outlet port formed in one side end surface. A lid member for opening/closing the port is mounted on the cartridge body and has an end surface. First label adhering portions are formed on the main surfaces and have boundary edges defined by side edges of the main surfaces. A second label adhering portion is formed on the end surface of the lid member to be adjacent to the side edges of the main surfaces. The second label adhering portion includes a position limit portion projecting along the side edges over each end of the boundary edges of the first label adhering portions. An indication label includes first indication surfaces adhered onto the first label adhering portions, and a second indication surface adhered onto the second label adhering portion.

16 Claims, 11 Drawing Sheets

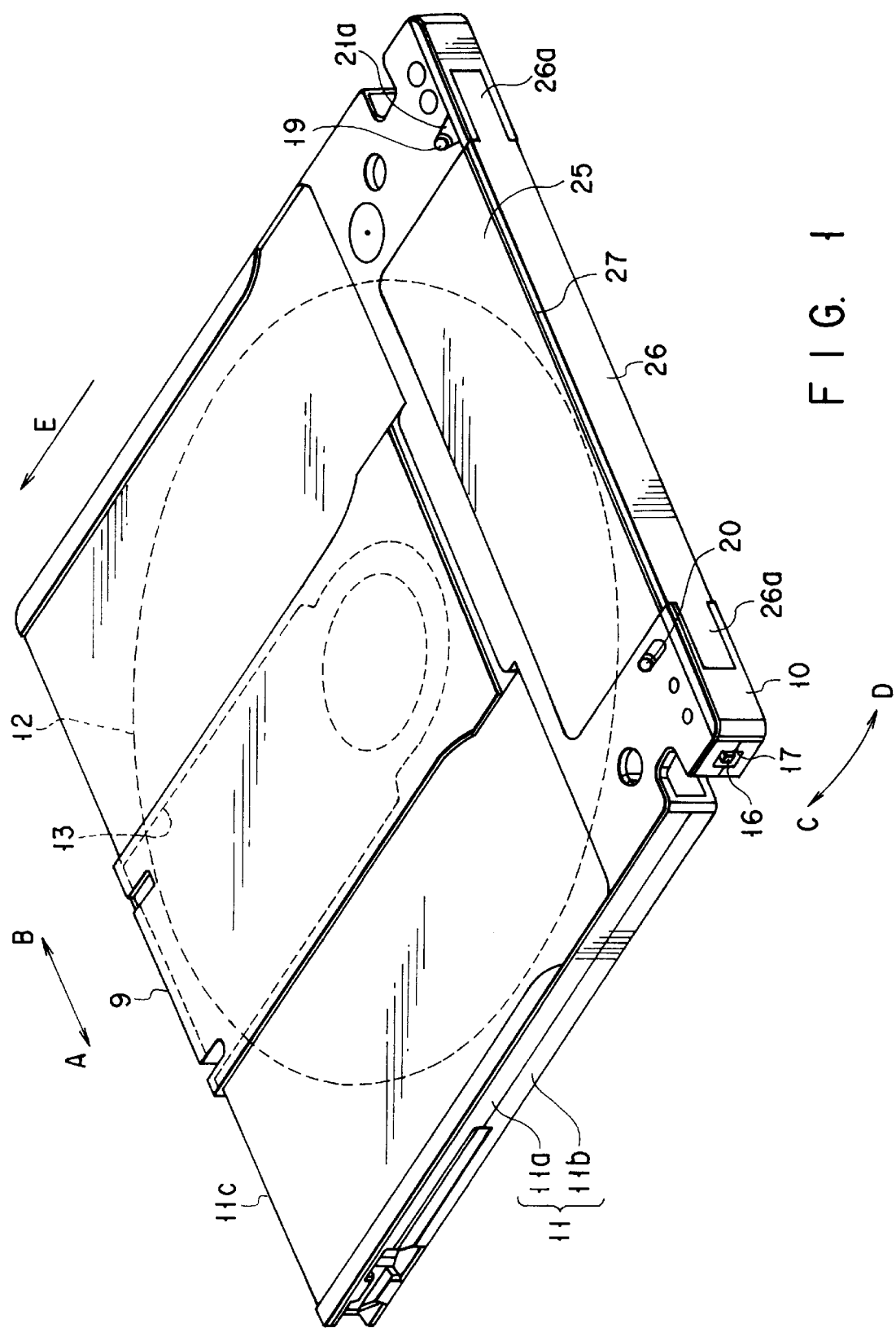
F I G. 1

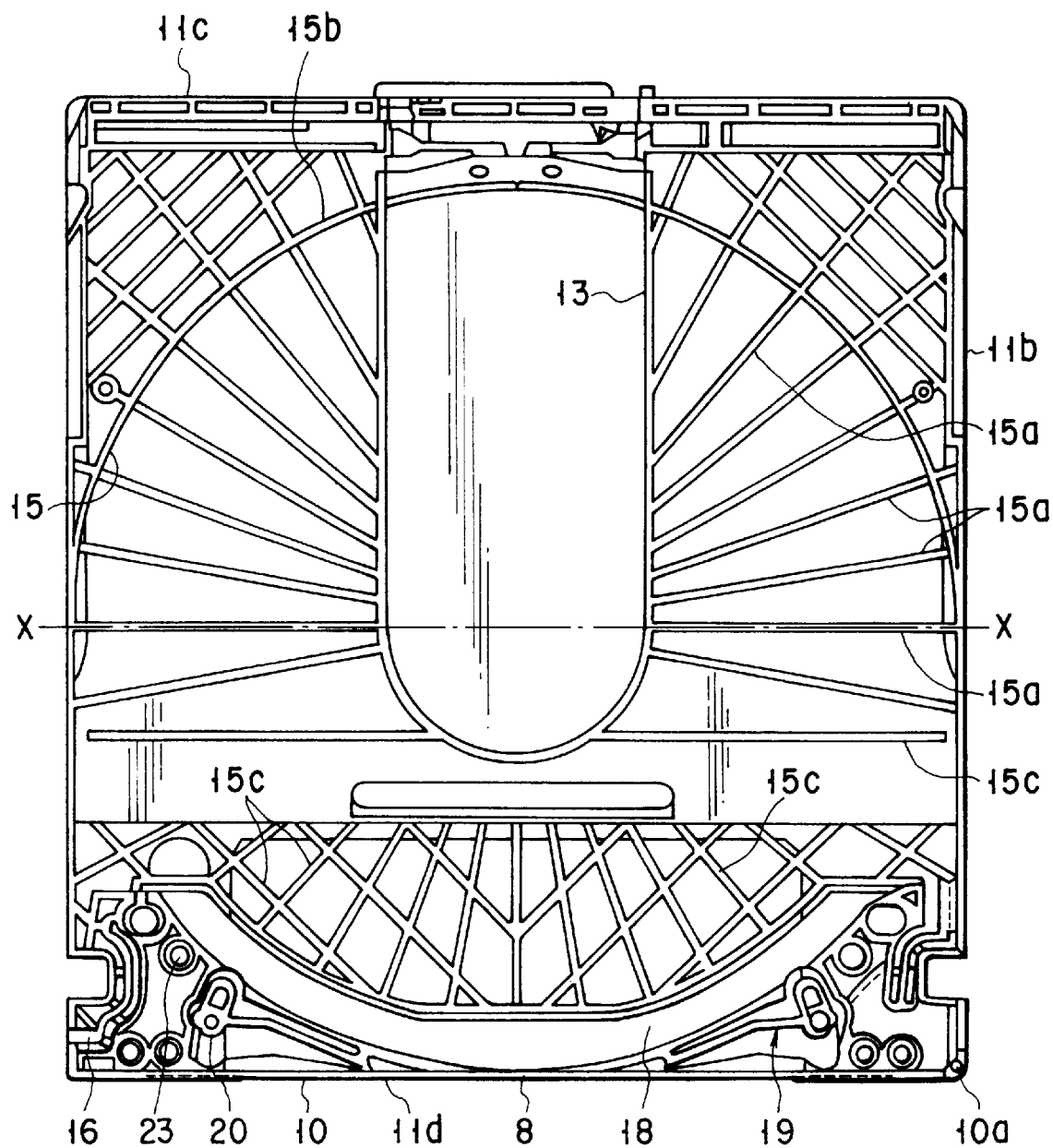
F I G. 3

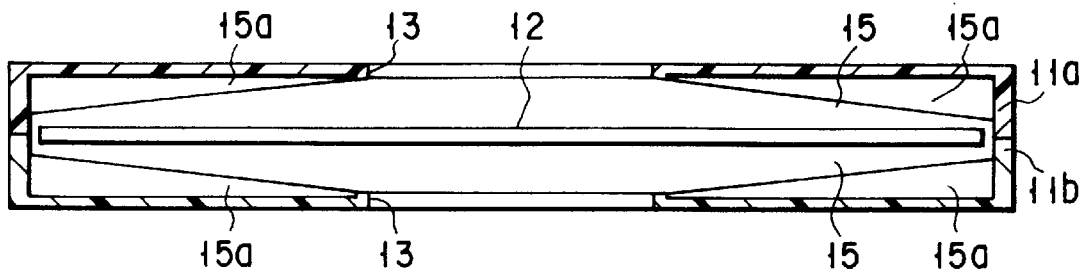
F I G. 4
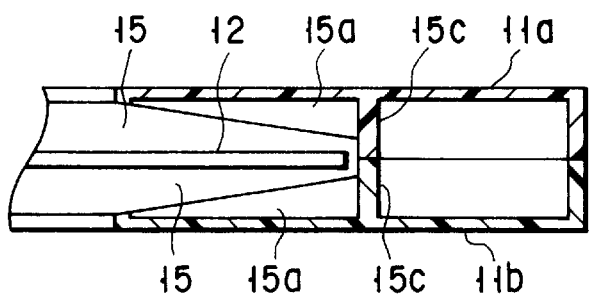
F I G. 5
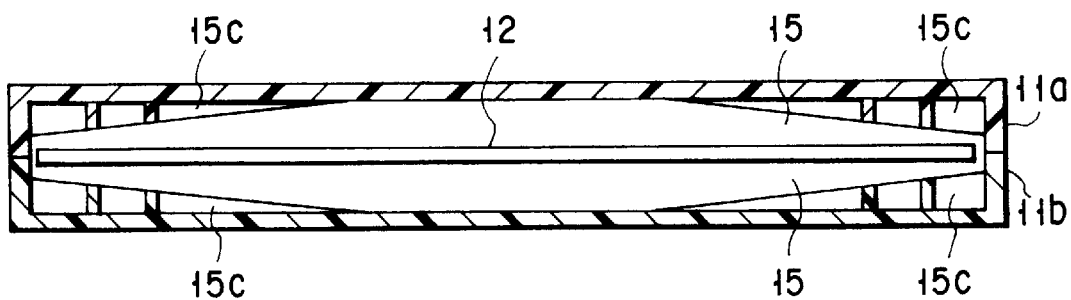
F I G. 6

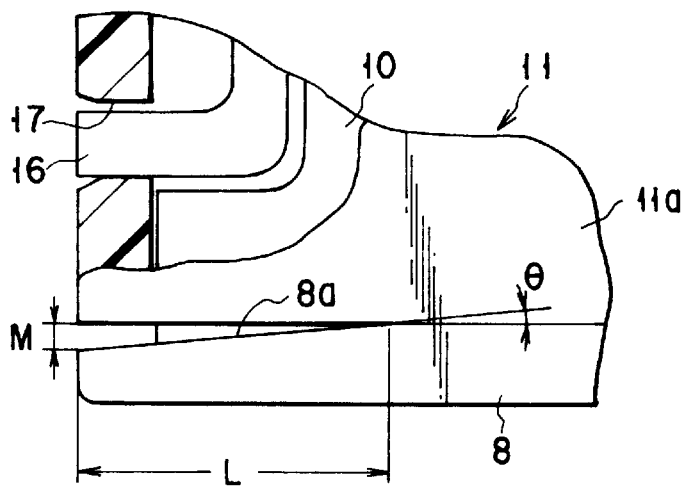
F I G. 8
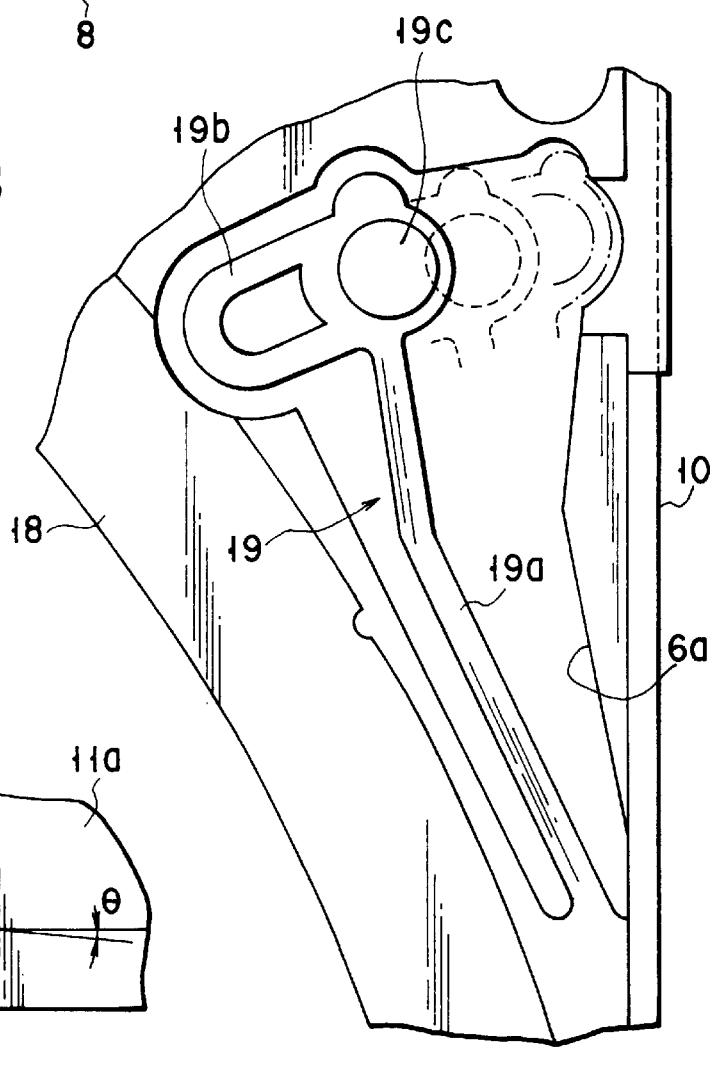
F I G. 9    F I G. 10

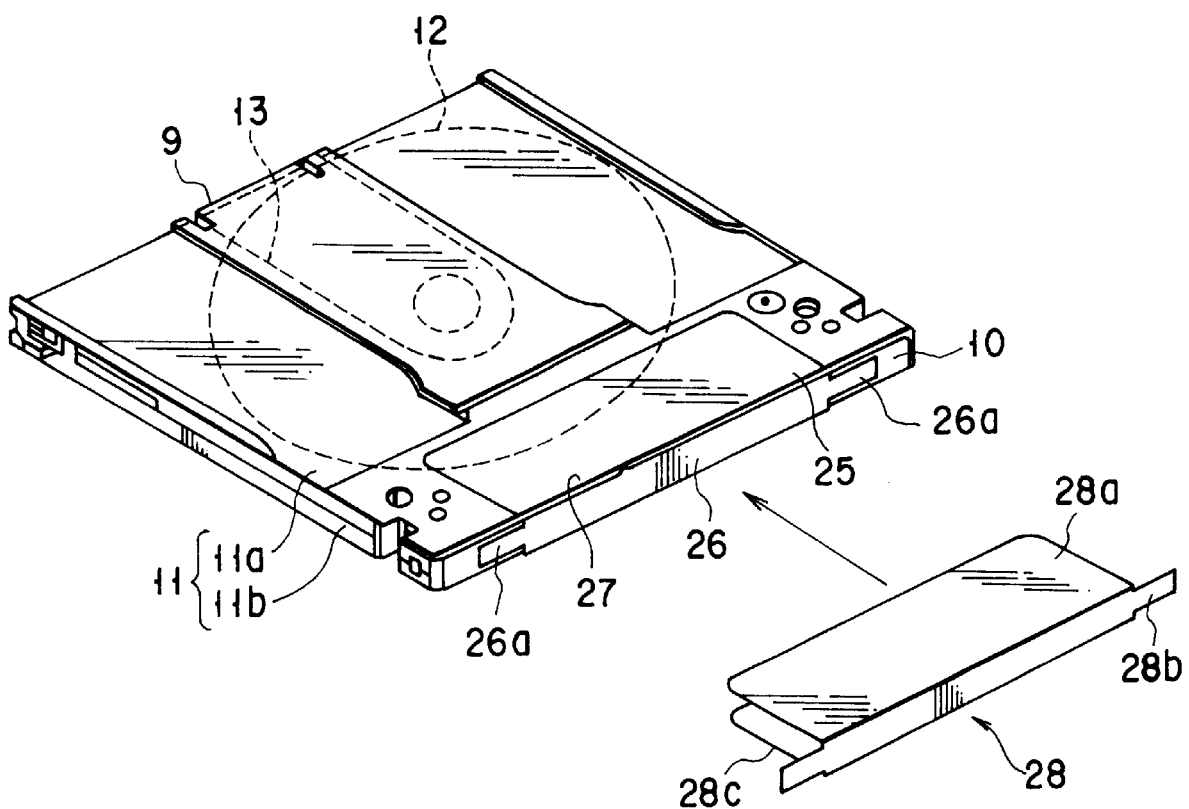
F I G. 16
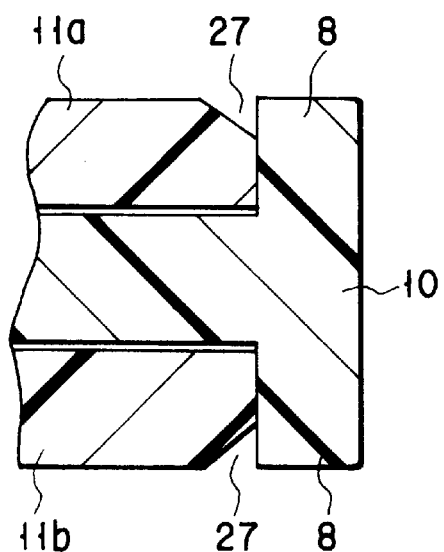
F I G. 17

DISC CARTRIDGE AND INDICATION LABEL FOR THE SAME

BACKGROUND OF THE INVENTION

1. Field of the Invention

The present invention relates to a disc cartridge which contains a disc-like, magneto-optical disc, a magnetic disc or the like and which has an opening section providing access to the recording medium to record and/or reproduce information signal.

2. Description of the Related Art

Conventionally, this kind of disc cartridge comprises a flat rectangular cartridge body consisting of an upper case and a lower case coupled with each other, and a disc such as an optical disc, magneto-optical disc, or an magnetic disc, rotatably contained in the cartridge body. Each of the upper and lower disc cases has an opening portion for exposing that region of the disc which extends from the center portion of the disc to the outer peripheral portion thereof. A pick-up and a turn-table for rotating the disc of a recording reproduction device can access the disc through the opening portions. In addition, the cartridge body is equipped with a slidable shutter for closing and opening the opening sections, which is made of a thin metal plate or hard synthetic resin.

On each of the outer surfaces of the cases is formed a concave label adhering portion recessed from the other portions of the surface, and an indication label for indicating the contents of the disc is adhered on to each of the label adhering portions.

When a disc cartridge having the above-mentioned structure is loaded into a disc recording/reproduction device, the shutter is slid at first to an end side of the cartridge body, thereby opening the opening portions. Subsequently, a turn-table is inserted into the cartridge body through one of the opening portions to support the disc, and a pick-up faces the surface of the disc through the opening portion. The disc is rotated by the turn-table, and recording and/or reproduction is performed by the pick-up.

In this kind of disc cartridge, the disc is contained in the cartridge body and the opening portions are closed by the shutter when the disc cartridge is not used, thus realizing safe disc storage. In addition, since the shutter is slid so that the disc in the cartridge body is exposed through the opening portions, to enable recording and reproduction and long-lasting use of the disc is realized.

In the disc cartridge having the structure as described above, however, the disc cannot be taken out of the cartridge body so that it is difficult to directly load the disc itself to the disc recording/reproducing device, for example. This kind of disc cartridge thus has severe limitations in view of degree of freedom in disc use.

Particularly, in recent years, there has been a demand for a disc cartridge applicable to both a disc recording/reproducing device which is used with one disc singly loaded thereto, and a disc recording/reproduction device which is used with the entire disc cartridge loaded thereto.

In addition, when a continuous indication label is adhered onto first and second label adhering portions on upper and lower cases of a disc cartridge, it is difficult to arrange the label surface of a desired indication label so as to a stick to a precise position, particularly, with respect to the second label adhering surface, thus making the adhering of labels very complicated. If the indication label does not stick to a precise position on the cartridge body, there is a possibility that the indication surfaces of the indication labels cannot be viewed or identified without difficulty when, for example, a plurality of disc cartridges are stacked on one another.

SUMMARY OF THE INVENTION

The present invention has been made in view of the above situation, and has its object to providing a disc cartridge and an indication label thereof which realize adhering of an indication label in a simple and easy manner.

To achieve the above object, the disc cartridge according to the present invention comprises: a cartridge body for storing a disc-like recording medium, the cartridge body including a pair of main walls which are parallel to each other and have inner surfaces respectively facing both surfaces of the recording medium, and side end walls continuous to the pair of main walls. At least one of the main walls has an opening portion for exposing a part of the surfaces of the recording medium. A shutter is slidably arranged on the cartridge body for opening and closing the opening portion. The main wall having the opening portion includes a first label adhering portion having a boundary edge extending along one side edge of the main wall. The side end wall continuous to the one side edge includes a second label adhering portion. The second label adhering portion including position limit portions projecting outwardly from opposite ends thereof generally parallel to the boundary edge. The second label adhering portion has a length between opposite, outward ends of the position limit portions longer than the boundary edge.

According to the disc cartridge constructed in the above structure, a part of an indication label is first engaged with the position limit portion and adhered on the second label adhering portion of the cartridge body, and the other portion is secondly adhered on the first label adhering portion. As a result of this, the entire indication label can be easily and securely adhered at a predetermined position with respect to the cartridge body, and thus, accurate indication is realized by the indication label.

In addition, the disc cartridge according to the present invention comprises: a cartridge body for rotatably storing a disc-like recording medium. The cartridge body includes a pair of main walls and respectively face both surfaces of the recording side end walls continuous to the pair of main walls, and a disc inlet/outlet port for removal and insertion of the recording medium. At least one main wall has an opening portion to expose one of the surfaces of the recording medium. A shutter is slidably arranged on the cartridge body for opening and closing the opening portion. A lid member is mounted on the cartridge body to be rotatable between a closed position wherein the lid member closes the disc inlet/outlet port and an opened position wherein the lid member opens the disc inlet/outlet port. The lid member includes an end surface defining one side end wall of the cartridge body when the lid member is in the closed position. The main wall having the opening portion includes a first label adhering portion having a boundary edge extending along one side edge of the main wall continuous with the disc inlet/outlet port. The lid member includes a second label adhering portion on the end surface thereof. The second label adhering portion includes position limit portions projecting outwardly from opposite ends thereof in directions generally parallel to the boundary edge of the first label adhering portion. The second label adhering portion has a length between opposite, outward ends of the position limit portions longer than the boundary edge. The disc cartridge further comprises an indication label including a first indication portion which has a shape corresponding to the first label adhering portion and which is adhered on the first label adhering portion, and a second indication portion which is formed to be continuous to the first indication surface. The second indication portion has a shape corresponding to the second label adhering portion and is adhered on the second label adhering portion. The indication label is separable along a boundary line extending between the first and second indication portions when the lid member is initially opened.

According to the disc cartridge as described above, the lid member can be opened to remove the recording medium from the cartridge body, and this recording medium can be singly used. In addition, the indication label adhered on the first and second label adhering portions are separated when the lid member is opened. Opening operation thus cannot be obstructed by the indication label.

Further, according to the present invention, a label separation groove for separating the indication label adhered on the firs and second label adhering portions is formed in the cartridge body. In this structure, the indication label adhered on the first and second label adhering portions can be separated into first and second label portions using the label separation groove. Thus, handling of the indication label can be enhanced.

The indication label according to the present invention is to be adhered on a pair of first label adhering portions which are respectively formed on a pair of main walls of a cartridge for rotatably storing a disc-like recording medium. The indication label is also to be adhered on a second label adhering portion which is formed on a side end wall continuous to the main walls and continuous to the pair of first label adhering portions along a pair of boundary lines. The indication label comprises: a pair of first indication portions having shapes corresponding to the first label adhering portions and being respectively adhered on the first label adhering portion. A second indication portion has a shape corresponding to the second label adhering portion and is continuous with the first indication portions along the boundary lines. The second indication is adhered onto the second adhering portion. The second indication portion includes position limit portions projecting outwardly from opposite sides thereof. The second indication portion has a length between opposing, outward ends of the position limit portions longer than each of the boundary lines.

According to the indication label constructed in the above structure, the first and second indication surfaces can be adhered on predetermined portions of the cartridge body, while, confirming the positions of the first and second indication surfaces independently from each other.

In addition, according to the indication label of the present invention, a cutting-guide line is provided on a boundary between the first and second indication portions, so that the first and second indication portions can be separated from each other along the cutting-guide line. Therefore, the first and second indication portions can be easily separated along the cutting-guide line, and can be independently adhered on each of the label adhering portions of the cartridge body. As a result, the indication label can be easily replaced.

Additional objects and advantages of the invention will be set forth in the descripton which follows, and in part will be obvious from the description, or may be learned by practice of the invention. The objects and advantages of the invention may be realized by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a perspective view showing a disc cartridge according to an embodiment of the present invention;

FIG. 3 is a plan view showing the lower case and the lid member of the disc cartridge;

FIG. 4 is a cross-section cut along the line IV—IV of FIG. 2;

FIG. 5 is a cross-section cut along the line V—V of FIG. 2;

FIG. 6 is a cross-section cut along the line VI—VI of FIG. 2;

FIG. 8 is an enlarged plan view showing a free end side of the lid member;

FIG. 9 is a plan view showing a modification of the lid member and the cartridge body;

FIG. 10 is an enlarged plan view showing the write-protect portion of the lid member;

FIG. 16 is a perspective view showing the disc cartridge and an indication label applied thereto;

FIG. 17 is a cross-section showing a label separation groove of the cartridge body;

DETAILED DESCRIPTION OF THE PREFERRED EMBODIMENTS

An embodiment of the present invention will now be described in detail with reference to the accompanying drawings.

Figure 2:
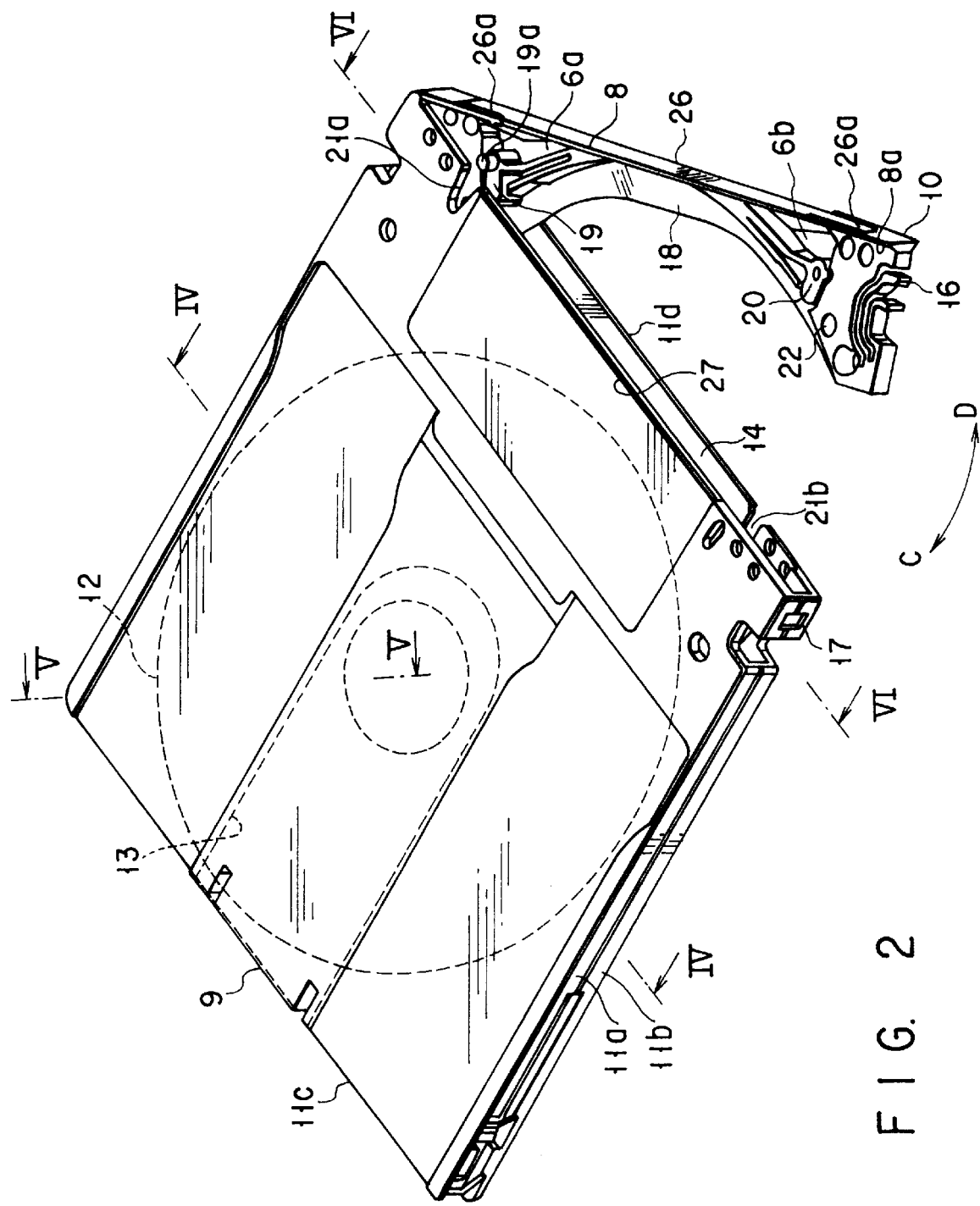
FIG. 2 is a perspective view of the above-mentioned disc cartridge where its lid member is opened.

As shown in FIGS. 1 and 2, a disc cartridge according to the present embodiment comprises a flat rectangular box-like cartridge body 11 and an optical disc 12 contained rotatably in the cartridge body. The cartridge body includes a pair of main walls (or main surfaces) which face each other and are in parallel with each other, and four side walls (or side surfaces) which are positioned continuously along the peripheral edges of the main walls.

The cartridge body 11 includes an upper casing 11a and a lower casing 11b which are substantially symmetrical to each other and made of synthetic resin such as ABS or the like. These casings are arranged so as to face each other and constitute the cartridge body 11. Further, a disc storing portion 15 which will be described later is defined within the cartridge body 11 and the optical disc 12 is stored in the disc storing portion 15 (FIGS. 4–6) with a predetermined clearance maintained between the disc surfaces and the inner surfaces of the cartridge body 11. The upper and lower casings 11a and 11b respectively face the surfaces A and B of the optical disc 12.

In addition, an opening 13 is formed in each of the upper and lower casings 11a and 11b. The openings 13 have a predetermined width, extend to the vicinity of the front surface 11c of the cartridge body 11 from the center portions of the casings, and face each other. These openings 13 respectively face the surfaces A and B of the optical disc 12 contained in the cartridge body 11, exposing the optical disc 12 to the outside over the region from the rotational center of the disc 12 to the outer periphery thereof.

The cartridge body 11 is provided with a shutter 9 of a double-side integral type which opens/closes both of the openings 13. The shutter 9 has a substantially U-shaped cross-section and is fitted onto the cartridge body 11 from the front surface 11c side so as to sandwich both surfaces of the cartridge body. As shown in FIGS. 1 and 2, the shutter 9 is slidable between a closed position wherein the shutter 9 closes the openings 13 and two open positions defined in both sides of the closed position wherein the shutter 9 opens the openings 13 in a direction (or direction A-B) parallel to the front end surface 11c of the cartridge body 11. Further, the shutter 9 is continuously biased toward the closed position by shutter springs not shown.

A disc inlet/outlet port 14 for inserting the optical disc 12 into and removing the optical disc from the cartridge body 11 is formed in the rear surface 11d of the cartridge body 11. The port 14 extends over the entire length of the rear surface 11d. In addition, a lid member 10 for opening closing the inlet/outlet port 14 is rotatably mounted on the cartridge body 11.

Here, supposing that the insert direction in which the disc cartridge is loaded into a disc record/reproduce device (not shown) is E, the end surface of the disc cartridge body 11 positioned in the forward side in the insert direction is defined as the front surface 11c, while the end surface of the disc cartridge body positioned in the backward side in the insert direction is defined as the rear surface 11d.

As shown in FIGS. 3 to 5, on the inner surface of the lower casing 11b, a number of ribs 15a extending in the radial direction from a central region of the lower casing corresponding to the center of the stored optical disc 12 and a rib 15b having an half-circle shape around the center of the lower casing as its center are provided in the second region between the center line X—X of the lower casing and the front surface 11c. These ribs 15a are arranged at predetermined intervals in the circumferential direction around the center of the lower casing 11b. Each of the ribs 15a is shaped such that the height is increased gradually in the radial direction from the center of the lower casing 11b. The semi-circular rib 15b has a diameter slightly larger than that of the optical disc 12.

Meanwhile, as shown in FIGS. 3 and 6, on the inner surface of the lower casing 11b, a number of ribs 15c are formed within a first region between the center line X—X of the lower casing and the rear surface 11d. These ribs 15c are formed such that the ribs are small in the middle region of the first region and are large in the area of both end portions thereof viewed in the widthwise direction of the lower casing 11b, i.e.,. in a direction parallel to the center line X—X.

Note that the upper casing 11a comprises ribs 15a, 15b, and 15c similar to those described above and is formed in the same manner as the lower casing 11b. Therefore, the disc storing portion 15 of the cartridge body 11, which is defined between the upper and lower casings, is shaped such that portion 15 is widest in the area of the center of the optical disc 12 and becomes narrower toward the outer circumference of the disc 12 in the front end half region (or the second region) of the cartridge body 11. With respect to the rear end half region (or the first region) of the cartridge body 11, the disc storing portion 15 has the smallest width at both end regions of the cartridge body 11 and has the largest width at the middle region between the both end regions. As a result of this, the optical disc 12 is contained in the disc storing portion 15, with only the peripheral edges supported and in contact with the inner surface of the cartridge body 11 when the optical disc 12 passes through the disc inlet/outlet port 14.

Although the upper and lower casings 11a and 11b of the cartridge body 11 define the disc storing portion 15 and the disc inlet/outlet port 14 by means of a plurality of ribs 15a, 15b, and 15c, the same shapes as the storing portion 15 and the port 14 may be defined by the inner surfaces of the casings themselves without using ribs.

Figure 7:
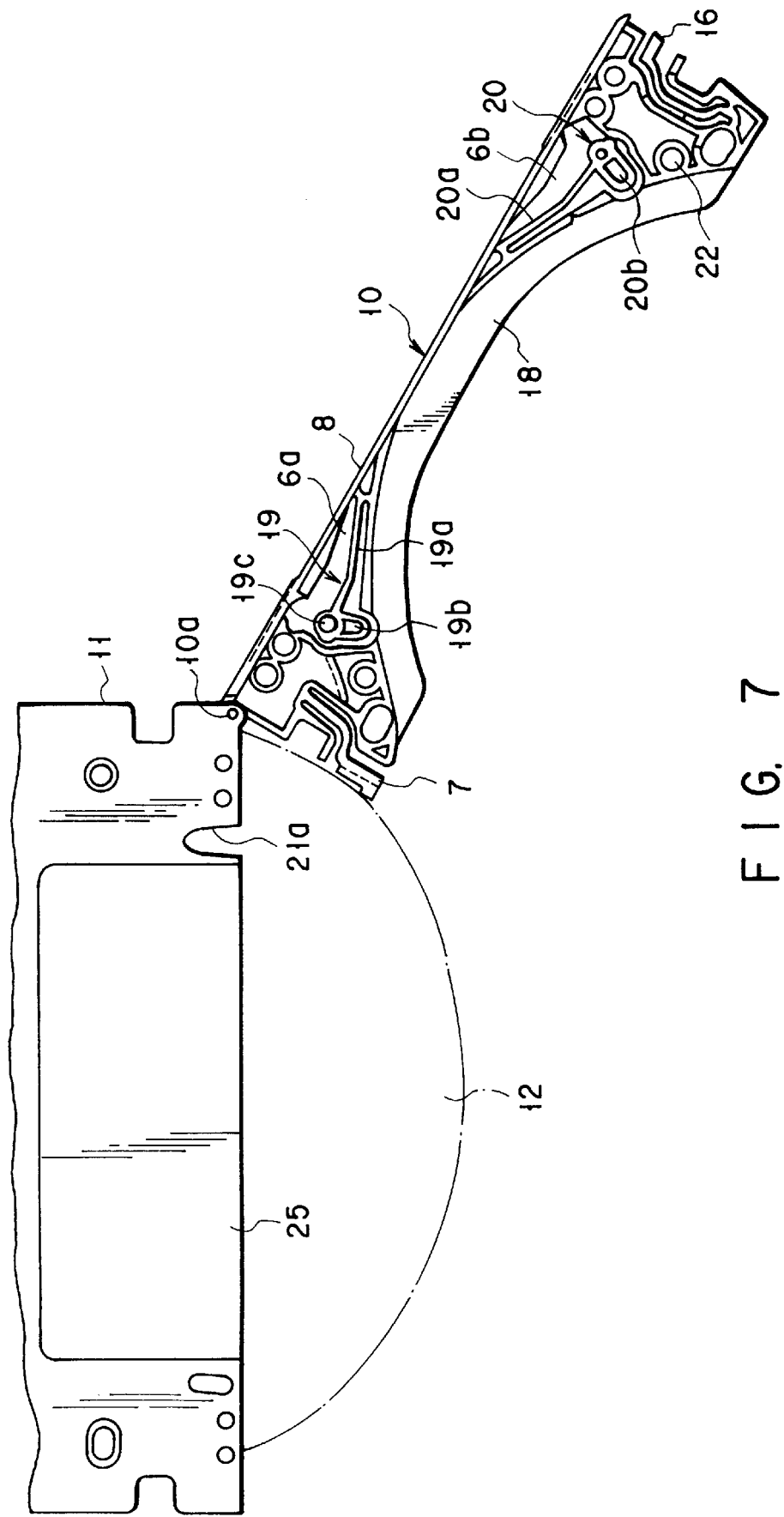
FIG. 7 is a plan view showing the lid member released.

As shown in FIGS. 2, 3, and 7, the lid member 10 is shaped like a flat elongated plate, has a length substantially equal to the width of the cartridge body 11 and has a thickness which allows the lid member to be fitted into the disc storing portion 15. A fringe 8 is formed at one side of the lid member 10 and extends over the entire width of the cartridge body. This fringe 8 projects upwards and downwards from the lid member 10 in the thickness direction of the cartridge body 11. The lid member 10 is integrally formed of synthetic resin, and is especially formed of synthetic resin of a color different from that of the cartridge body 11.

One end of the lid member 10 is pivoted on a rear right corner portion of the cartridge body 11 by a pivot shaft 10a. Therefore, the lid member 10 can be rotated in the arrow direction C-D around the pivot shaft 10a, thereby opening and closing the disc inlet/outlet port 14. When the lid member 10 is rotated to a closed position, the lid member 10 enters into the disc storing portion 15 through the disc inlet/outlet port 14, and the fringe 8 abuts against the rear end edges of the cartridge body 11, thereby closing the disc inlet/outlet port 14.

A free end portion of the lid member 10, i.e., the end portion of the lid member 10 which is opposite the pivot shaft 10a, is provided with a lock claw 16, which is elastically deformable, while an engage hole 17, which engages the lock claw 16, is formed in the rear end portion of the left side wall of the cartridge body 11. Therefore, when the lid member 10 is rotated to the position where the lid member 10 closes the disc inlet/outlet port 14, the lock claw 16 engages the engage hole 17, thereby locking the lid member 10 to the closed position. Note that this locking can be released and the lid member 10 can be opened by pushing the lock claw 16 inward through the engage hole 17 from the outside of the cartridge body 11.

As shown in FIG. 8, at the free end portion of the lid member 10, slanting surfaces 8a are formed on the fringe 8 such that a clearance M is formed between the fringe 8 and the rear edges of the upper and lower casings 11a and 11b, where the lid member 10 is closed. Each of the slanting surfaces 8a extends outwards in the direction of a 10° angle from the point positioned apart from the free end of the fringe 8 by a length L. Thus, a clearance M of about 0.3 mm is obtained at the free end of the lid member 10.

In the above structure, the lock claw 16 of the lid member 10 and the engage hole 17 of the cartridge body 11 can be engaged with each other with a minimum margin, thereby preventing backlash of the lid member 10 in the close position. Specifically, the lock claw 16 is positioned and formed in a manner such that the free end portion of the lid member 10 is pushed further toward the rear surface 11d side by the clearance M and is thus elastically deformed so that the lock claw 16 is engaged with the engage hole 17 after the lid member 10 is rotated to the close position to bring the portion of the fringe 8 other than the slanting surface 8a into contact with the rear surface 11d of the cartridge body. Therefore, when the pushing force applied to the free end portion of the lid member 10 is released after the lock claw 16 is engaged with the engage hole 17, the free end portion of the lid member 10 generates an elastic force in the direction in which this free end portion is apart from the rear end surface 11d of the cartridge body 11, and the lock claw 16 is kept engaged with the engage hole 17 by this elastic force. Therefore, the lid member 10 securely closes the disc inlet/outlet port 14 of the cartridge body 11 without backlashing.

The same function described above can be obtained if slanting surfaces 11e are formed on the rear end surface 11d of the cartridge body 11, as shown in FIG. 9, in place of forming slanting surfaces 8a on the fringe 8 of the lid member 10.

As shown in FIGS. 2, 3, and 7, the lid member 10 is provided with an arc-like disc guide recess 18 in correspondence with the disc storing portion 15 of the cartridge body 11. When the lid member 10 is closed, a part of the optical disc 12 is positioned in the disc guide recess 18. When the optical disc 12 stored in the disc storing portion 15 is removed from the cartridge body 11 through the disc inlet/outlet port 14 while the lid member 10 is rotated in the open position, the outer peripheral portion of the optical disc 12 is partially stored in the disc guide recess 18 and is thus prevented from suddenly or directly falling from the cartridge 11.

In addition, a stopper 7 having a claw-like shape which can be elastically deformed is provided at the end portion of the lid member 10 in the side close to the pivot shaft 10a. This stopper 7 elastically hangs on the outer peripheral portion of the optical disc 12 and prevents the optical disc from suddenly falling, when the lid member 10 is sufficiently opened and the optical disc 12 is extracted out of the cartridge body 11.

As shown in FIGS. 2, 3, 7, and 10, first and second write protect operating portions 19 and 20, which are elastically deformable, are integrally formed on the lid member 10, so as to correspond to the surfaces A and B of the optical disc 12. For example, the first write protect operating portion 19 includes an arm portion 19a projecting from the substantial center portion of the lid member 10 in the widthwise direction thereof toward the end portion of the lid member 10 close to the pivot shaft 10a side, a sector portion 19b provided at the extended end of the arm portion 19a, and a switch operating element 19c projecting from the sector portion 19b toward the upper casing 11a side. Further, the first write protect operating portion 19 is positioned in an opening 6a formed in the lid member 10, and only the proximal end of the arm portion 19a is connected to the lid member. As a result, the write protect operating portion 19 is thus rotatable in the opening 6a around the proximal end of the arm portion 19a as the rotational center.

The second write protect operating portion 20 is formed to be symmetrical to the first write protect operating portion 19 with respect to the center of the lid member 10 in the widthwise direction thereof. Specifically, the second write protect operating portion 20 includes an arm portion 20a, a sector portion 20b provided at the extended end of the arm portion, and a switch operating element 20c (see FIG. 11C) projecting from the sector portion toward the lower casing 11b side. Further, the second write protect operating portion 20 is positioned in an opening 6b formed in the lid member 10, and only the proximal end of the arm portion 20a is connected to the lid member.

In the vicinity of the pivot shaft 10a of the lid member 10, a storing hole 21a is formed in the rear end portion of the upper casing 11a and open to the rear end surface 11d. In the vicinity of the engage hole 17, another storing hole 21b is formed in the rear end portion of the lower casing 11b and open to the rear end surface 11d. Further, where the lid member 10 is closed, the switch operating element 19c of the first write protect operating portion 19 and the switch operating element 20c of the second write protect operating portion 20 are respectively stored in the storing holes 21a and 21b, and the first and second write protect operating portions 19 and 20 can be actuated through the storing holes.

Upon assembling the disc cartridge, when the lid member 10 is attached to the cartridge body 11 at the disc inlet/outlet port 14, the lid member 10 is first mounted at a predetermined position on the lower casing 11b. In this case, the pivot shaft 10a integrally formed with the lid member 10 inserted into a hole (not shown) of the lower casing 11b, and the lid member 10 is maintained at its closed position. Next, the upper casing 11a is covered over the lid member 10 and the lower casing 11b from the upside, such that the pivot shaft 10a of the lid member 10 is inserted into a hole (not shown) of the upper casing. In this manner, the lid member 10 is assembled between the upper and lower casings 11a and 11b and kept at the closed position.

Figure 11A:
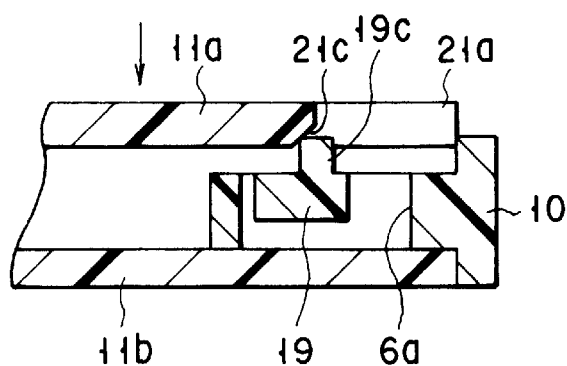
FIGS. 11A and 11B are cross-sections schematically showing a step of positioning a first write-protect operating portion.
Figure 12A:
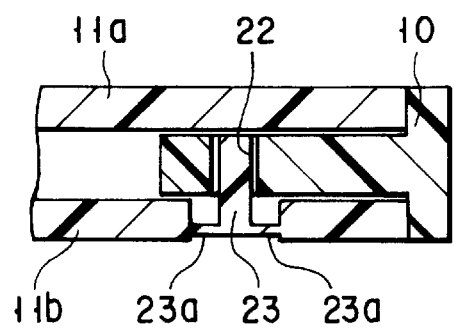
FIG. 12A is a cross-section showing an opening detect portion of the disc cartridge.
Figure 11B:
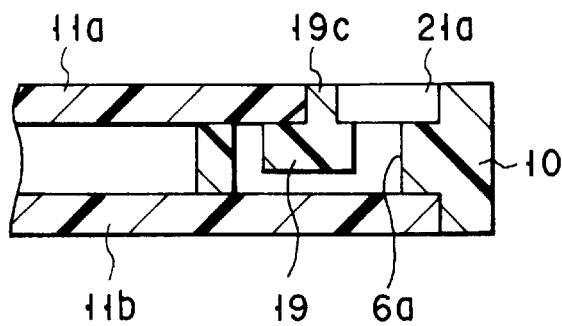
Figure 12B:
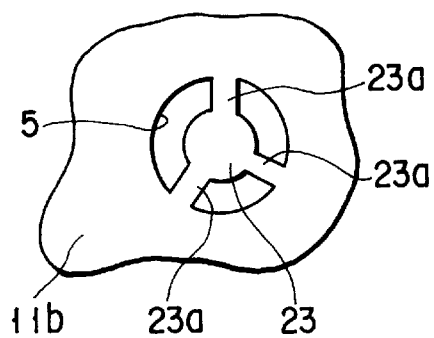
FIG. 12B is a plan view showing a detect pin portion of the opening detect portion.
Figure 11C:
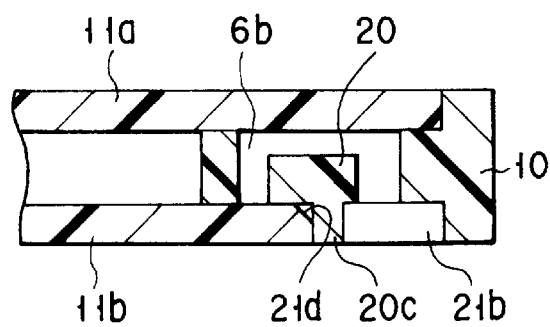
FIG. 11C is a cross-section schematically showing a step of positioning a second write-protect operating portion.

Here, as shown in FIGS. 11A and 11B, the storing hole 21a formed in the upper casing 11a has a slanting surface 21c which is positioned in the bottom side of the storing hole 21a and in the inner surface side of the upper casing 11a and which functions as guide means. When the upper casing 11a is covered over the lower casing 11b, the switch operating element 19c of the first write protect operating portion 19 of the lid member 10 is guided to the rear end surface side of the upper casing 11a along the slanting surface 21c of the storing hole 21a. At the time where connection between both casings is completed (or in the state where assembling of both casings is completed), the switch operating element 19a is contained in the storing hole 21a, kept in contact with the bottom end of the storing hole 21a, and the first write protect operating portion 19 is positioned at a predetermined initial operating position.

Specifically, the first write protect operating portion 19 is in a molding position indicated by a solid line in FIG. 10 before the lid member 10 is assembled into the cartridge body 11. Further, the first write protect operating portion 19 is automatically positioned at the initial operating position indicated by a broken line in FIG. 10 when the lid member 10 is assembled in the cartridge body 11. Then, this first write protect operating portion 19 is switched between the initial operating position (e.g., a write protect position) and a switched position (or a write allowable position) indicated by a dotted and dashed line shown in FIG. 10. Note that the initial operating position may otherwise be set to a write allowable position while the switched position may be set to the write protect position.

Likewise, the second write protect operating portion 20 is positioned at an initial operating position at the time point, such that the switch operating element 20c is guided along the slanting surface 21d of the storing hole 21b formed in the lower casing 11b and is brought into contact with the bottom end of the storing hole 21b, and that the operating portion 20 can be operated, when connection between the upper casing 11a and the lower casing 11b is completed.

As shown in FIGS. 1 to 3, 7, 12A, and 12B, the disc cartridge comprises an opening detect mechanism for detecting whether the lid member 10 is opened or closed. Specifically, a through-hole 22 for detecting whether the lid member is opened or closed is formed in the vicinity of the free end of the lid member 10, and extends in the direction perpendicular to the moving direction of the lid member 10. In a state in which the lid member 10 is in the closed position, a detection pin 23 standing on the inner surface of the lower casing 11b is inserted in the through-hole 22.

The proximal end portion of the detect pin 23 is positioned in a circular opening 5 defined in the lower casing 11b and is formed integrally with the lower casing 11b while being connected to the lower casing 11b through thin bridges 23a, so that the pin 23 can be easily bent and taken off from the lower casing 11b. The opening 5 is aligned with the through-hole 22 of the lid member 10 when lid member 10 is in the closed position. Further the detect pin 23 is inserted into the through-hole 22 when attaching the lid member 10 to the casings so as to correspond to the disc inlet/outlet port 14 of the lower casing 11b while assembling the disc cartridge.

Before the lid member 10 is opened for the first time after assembling the disc cartridge, the detect pin 23 is kept inserted in the through-hole 22 of the lid member 10. Therefore, the through-hole 22 is closed by the detect pin 23, and cannot be used to detect whether or not the lid member 10 has once been opened.

If the lid member 10 is rotated and opened in the arrow direction D around the pivot shaft 10a as the rotation center to extract the optical disc 12 from the cartridge body 11, the detect pin 23 is pushed by the lid member 10 and is bent at the bridges 23a and detached from the lower casing 11b, so that detect pin 23 is removed together with the lid member to the outside of the cartridge body. In addition, the circular opening 5 is formed as a mark of the detect pin 23 after this pin is taken off. Therefore, when the lid member 10 is closed again, the circular opening 5 of the lower casing 11b and the through-hole 22 of the lid member 10 are aligned with each other. Consequently, the through-hole 22 of the lid member 10 can be detected through the opening 5.

If the lid member 10 is thus opened from the disc inlet/outlet port 14 to a state in which the disc can be extracted, the detect pin 23 of the lower casing 11b is removed, and as a result, it is possible to detect that the lid member 10 has once been opened, i.e., that the optical disc 12 has once been extracted from the cartridge body 11. Note that the detect pin 23 may also be provided on the upper casing 11a.

Figure 13:
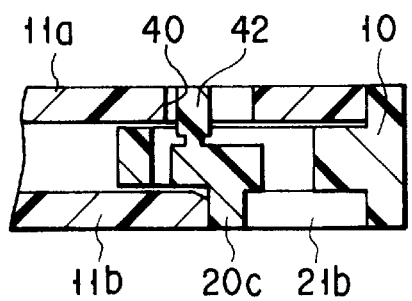
FIG. 13 is a cross-section showing a modification of the opening detect portion.

As shown in FIG. 13, the opening detect mechanism may have another construction wherein a through-hole 40 for detecting whether the lid member 10 is opened or closed is formed in the upper casing 11a and a detect pin 42, which is engaged with the through-hole 40 and can be easily bent and removed, is provided on the lid member 10, e.g., on the write protect operating portion 20, so that the detect pin 42 is bent and detached when the lid member 10 is rotated and opened from the disc inlet/outlet port 14 of the cartridge body 11. In this manner, whether the through-hole 40 formed in the upper casing 11a is closed or opened is detected and whether or not the lid member 10 has been opened is identified. In this case, the through-hole 40 used for detection may be formed in the lower casing 11b.

The through-hole 40 is formed to be elongated in the moving direction of the write protect operating portion 20 so that the write protect operating portion 20 can be switched and operated in the state where the lid member 10 is closed. In addition, the through-hole 40 and the detect pin 42 extend in a direction perpendicular to the moving direction of the lid member 10.

Figure 14A:
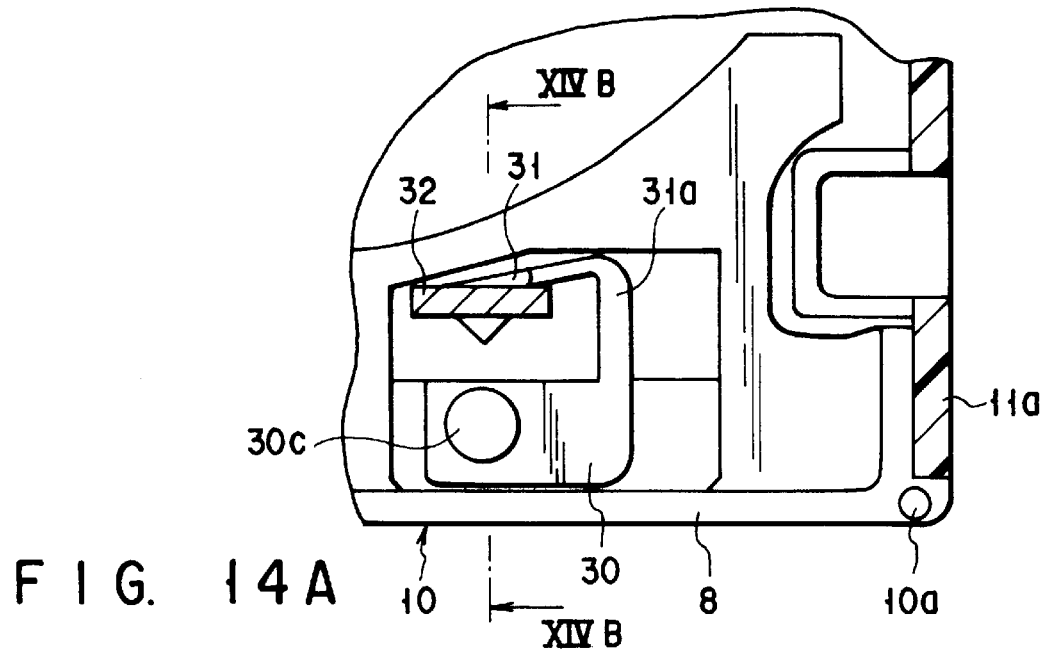
FIG. 14A is a plan view showing another modification of the opening detect portion.
Figure 14B:
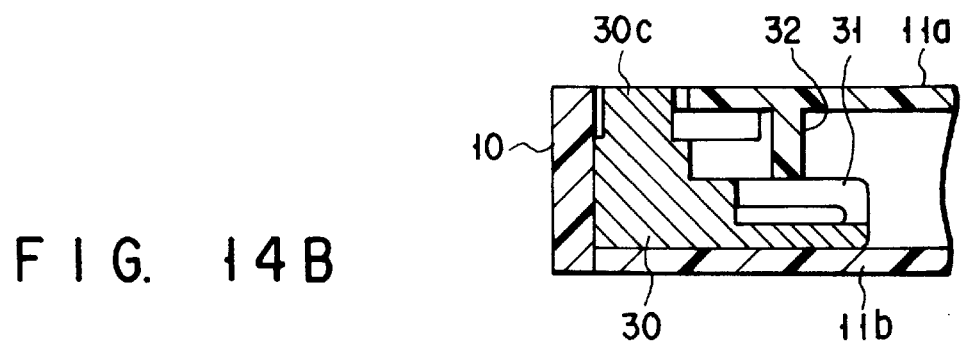
FIG. 14B is a cross-section showing the opening detect portion according to the another modification.
Figure 15:
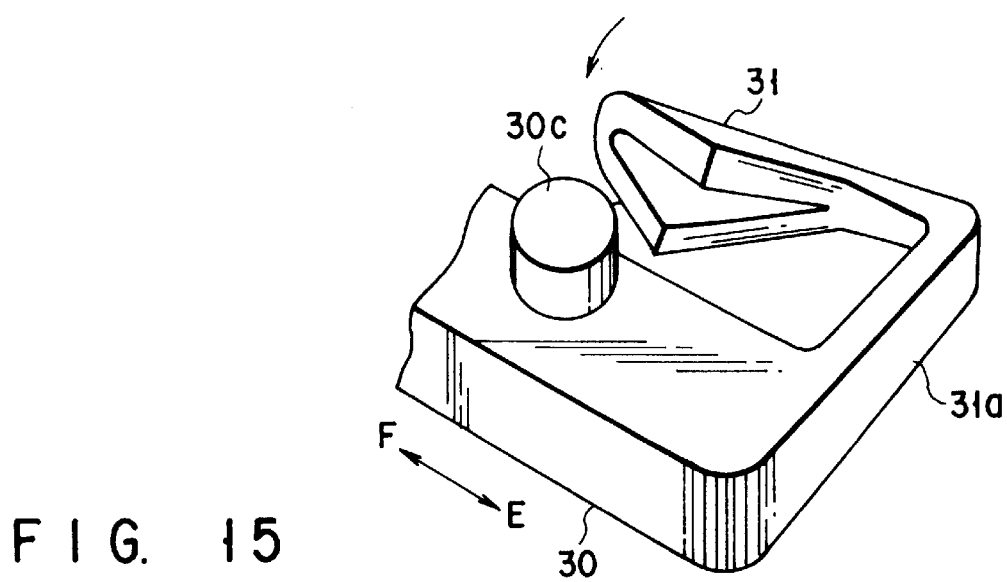
FIG. 15 is a perspective view showing the write-protect operating portion of the opening detect portion according to the another modification.

In addition, the opening detect mechanism may be constructed as shown in FIGS. 14A, 14B, and 15. Specifically, the lid member 10 is provided with a write protect operating portion 30, which is movable in an arrow direction E-F. This write protect operating portion 30 is provided with a bent portion 31 through an elastic arm 31a, and the bent portion 31 is bent in a V-shape and can be elastically deformed through the elastic arm 31a. An operating element 30c is formed on the write protect operating portion 30. In addition, a position limit projection 32 that abuts against the bent portion 31 is projected on the inner surface of the upper casing 11a. Further, when the lid member 10 is provided between the upper and lower casings 11a and 11b, the bent portion 31 is brought into contact with the position limit projection 32 and is installed in a bent position by being deformed by the limit projection 32 against the elasticity of the bent portion 31 itself.

In the structure described above, when the lid member 10 is rotated in the arrow direction D with respect to the cartridge body 11, as has been described above, this lid member 10 opens the disc inlet/outlet port 14 of the cartridge body 11 and, simultaneously, the bent portion 31 leaves the position limit projection 32.

When the lid member 10 once opened is rotated in the arrow direction C, thereby closing the disc inlet/outlet port 14 of the cartridge body 11, the corner portion side of the write protect operating portion 30 is brought into contact with the position limit portion 32, and is rotated in the counterclockwise direction by the position limit projection 32 in accordance with rotation of the lid member. As a result, the write protect operating portion 30 is moved in the arrow direction E and locked at the write protect position. Further, whether or not the lid member 10 is opened from the disc inlet/outlet portion 14 is identified on the basis of the position of the write protect operating portion 30.

In the rear end portion of the cartridge body 11, as shown in FIGS. 1, 16, and 17, first label adhering portions 25, each having a rectangular concave shape and each recessed from the other portions, are respectively formed in the main surfaces of the upper and lower casings 11a and 11b. (For conveniences, FIG. 1 shows only one of the first label adhering portions 25 which is provided in the upper casing.) In addition, a second label adhering portion 26 having an elongated rectangular shape is formed on the outer surface of the lid member 10 and is continuous to the first label adhering portions 25.

Concave position limit portions 26a projecting to both sides of the cartridge body 11 are respectively provided at both ends of the second label adhering portion 26. Further, label separation grooves 27 are formed on the rear end edges of the upper and lower casings 11a and 11b and extend along the boundaries between the first label adhering portions 25 and the second label adhering portion 26.

An indication label 28 having first, second and third rectangular indication surfaces 28a, 28b, and 28c is adhered on the first and second label adhering portions 25 and 26 of the cartridge body 11, as shown in FIG. 16. Among these indication surfaces, the second indication surface 28b is shaped so as to have a longer length dimension than the first and third indication surfaces 28a and 28c, and is positioned with respect to the second label adhering portion 26 in such a manner that three edges of each side projecting portion of the indication surface 28b are matched with the corresponding position limit portion 26a of the second label adhering portion 26. At the same time, the first and third indication surfaces 28a and 28c of the indication label 28 are adhered onto the first label adhering portions 25 such that the end portions of these surfaces respectively correspond to the end portions of the first label adhering portions 25 of the upper and lower casings 11a and 11b.

The position limit portions 26a of the second label adhering portion 26 is formed such that the position limit portions 26a define at least two end edges of the indication surface 28b of the indication label 28.

Further, the indication label 28 thus adhered on the first and second label adhering portions 25 and 26 can be easily divided into first to third indication surfaces 28a to 28c, by tracing the label separate grooves 27 of the cartridge body 11 with use of a tool such as a pen or the like. Therefore, the indication label 28 adhered on the first and second label adhering portions 25 and 26 can easily be replaced, partially, in units of first to third indication surfaces 28a to 28c. As a result of this, when information in the optical disc 12 is over-written, for example, the label can be easily replaced in such a manner that replacement of a current indication label does not affect records on other portions of the current indication label.

Hence, the indication label 28 is adhered on a base sheet 33 with an adhesion applied on the back surface of the label, such that the label 28 can be peeled off from the sheet, as shown in FIGS. 18A to 18D. In the indication label 28 shown in FIG. 18A, boundaries between first to third indication surfaces 28a to 28c are not processed. However, perforation-like cutting guide lines (FIG. 18B) may be formed at a predetermined distance maintained therebetween, or cutting guide lines (FIG. 18C) continuously extending in the widthwise direction to the middle area of the boundaries may be formed on the boundaries, so that first to third indication surfaces can be separated from each other upon requests after the indication label 28 is adhered on the cartridge body 11. In this manner, handling ability of the label 28 can be improved when adhering labels.

Figure 18A:
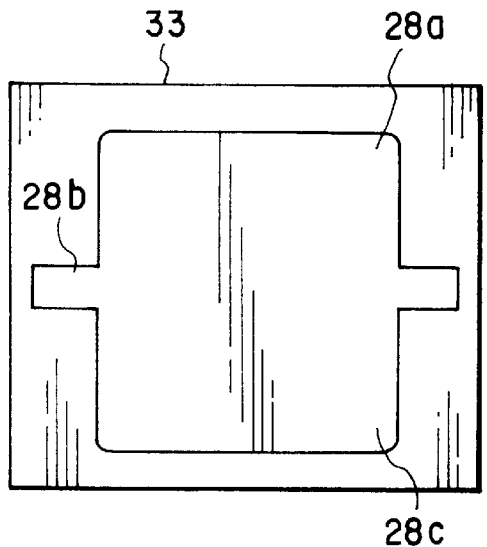
FIGS. 18A to 18D are plan views respectively showing different indication labels.
Figure 18B:
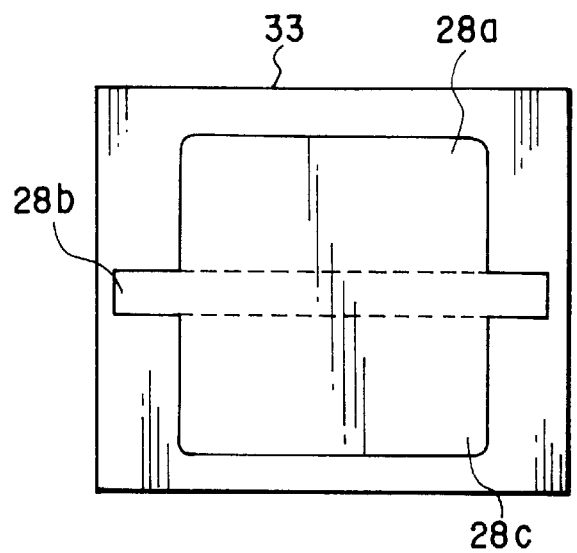
Figure 18C:
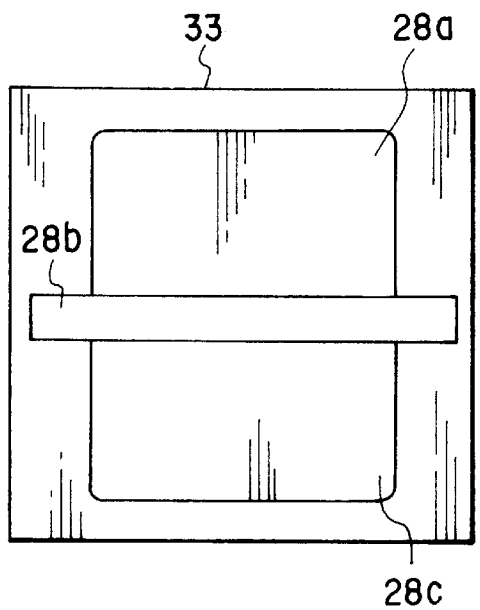
Figure 18D:
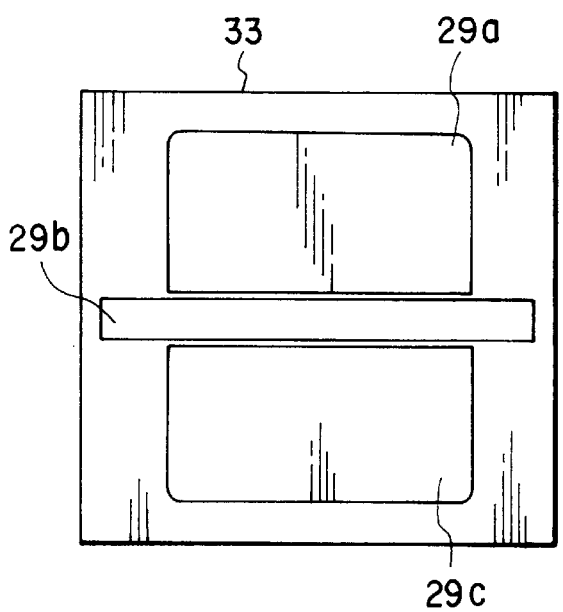
Figure 19:
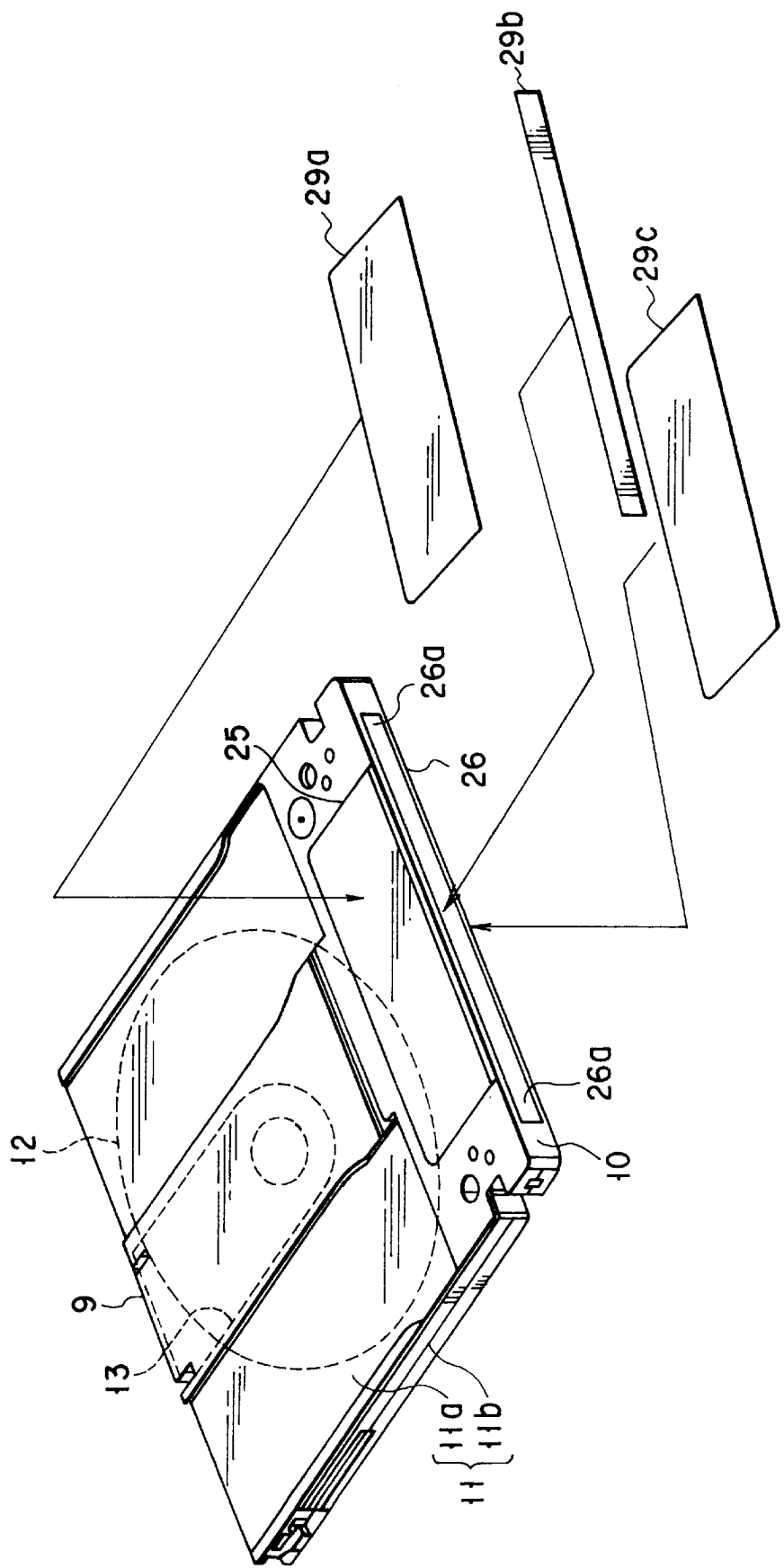
FIG. 19 is a perspective view showing the disc cartridge and another indication label applied thereto.

Otherwise, as shown in FIG. 19, indication labels 29a to 29c each having one single indication surface may be independently adhered on the first and second label adhering portions 25 and 26 of the cartridge. Then, the adhering area of the second label adhering portion 26 of the lid member 10 in the rear end of the cartridge body 11 can particularly be enlarged, so that the indication contents can achieve a high degree of freedom. In this case, the indication labels 29a to 29c are independently adhered on the base sheet, as shown in FIG. 18D.

When the disc cartridge constructed as described above is loaded into a disc recording/reproducing device (not shown) along the insert direction E shown in FIG. 1, the shutter 9 is slid toward an end side (to the left or right) at first by the shutter opening/closing means in the device, and the opening 13 is thereby opened. Then, a turn table (not shown) enters through the opening portion 13 into the cartridge body 11 to rotatably support the optical disc 12 while a pick-up faces one surface of the optical disc 12 through the opening portion 13.

In this state, the optical disc 12 is rotated by the turn-table, and information signals are recorded on and/or reproduced from the optical disc 12 by the pick-up. To record information into the optical disc 12, the first or second write protect operating portion 19 or 20 must be previously set to the write allowable position.

To extract the optical disc 12 from the cartridge body 11, the lock claw 16 of the lid member 10 is pushed against the elasticity of itself, so as to leave the engage hole 17, and the lid member is rotated in the arrow direction D. Then, the disc 12 stored in the disc storing portion 15 of the cartridge body 11 is guided along the disc guide groove portion 18 of the lid member 10, passing through the disc inlet/outlet port 14. In this state, the lid member 10 bends and detaches the open/close detect pin 23 provided in the lower casing 11b of the cartridge body 11, in association with its rotation, thereby indicating that the lid member 10 has been opened so that the disc can be extracted.

Lid member 10 closes the disc inlet/outlet port 14 when the lid member 10 is rotated in the arrow direction C from its open position. In this case, if the free end portion of the lid member 10 is pushed until it eliminates the clearance M and abuts against the rear surface 11d of the cartridge body 11, the lock claw 16 is elastically engaged with the engage hole 17, and the lid member 10 securely closes the disc inlet/outlet port 14 while being kept in contact with the rear surface of the cartridge body 11 by the elastic force of the lid member.

According to the disc cartridge constructed as described above, the cartridge body 11 is provided with the disc inlet/outlet port 14, and the lid member 10 for opening/closing the disc inlet/outlet port. In addition, the first label adhering portions 25 are formed on the main walls of the cartridge body and a second label adhering portion 26 which is continuous to the first label adhering portions and which has position limit portions projecting to be longer than the first label adhering portions on both sides formed on the end surface of the lid member. Therefore, the indication surfaces 28a and 28c including the center indication surface 28b of the indication label 28 can be precisely adhered at predetermined positions of the cartridge body 11, so that a disc cartridge can be provided which achieves simplicity and easy operation.

In addition, the indication label 28 includes first and third indication surfaces 28a and 28c to be adhered on the first label adhering portions 25 respectively formed on both main surfaces of the cartridge body 11. The indication label 28 also includes a second indication surface portion 28b to be adhered on the second label adhering portion 26 formed on the lid member or side wall. Further, the second indication portion 28b is formed to project outwardly parallel to the boundary edge between the first and second label adhering portions.

Therefore, the first to third indication surfaces 28a, 28b, and 28c of the indication label 28 are respectively adhered on predetermined positions of the first and second label adhering portions 25 and 26 of the cartridge body 11, independently confirming their positions, so that these indication surfaces are securely prevented from being displaced.

Note that the present invention is not limited to the above-mentioned embodiments, but can be variously modified within the scope of the present invention.

For example, the above explanation has been made to an embodiment applied to the optical disc 12 having data recording surfaces on both sides. However, the present invention is not limited thereto but can be applied to a disc which has a data recording surface on only one side. In this case, the write protect operating portion is provided for only one side of he cartridge body 11. In addition, the recording medium contained in the cartridge body is not limited to an optical disc, but any other kind of disc-like recording medium such as a magnetic disc, a magneto-optical disc, or the like is applicable.

Further, the indication label according to the present invention is applied to a disc cartridge comprising a lid member and wherein the disc can be taken out, in the explanation described above. The present invention, however, is applicable to a disc cartridge from which the disc contained in the cartridge body cannot be extracted.

What is claimed is:

1. A disc cartridge comprising:
    a cartridge body for rotatably storing a disc-like recording medium, said cartridge body including:
        a pair of generally parallel main walls having inner surfaces respectively facing opposing surfaces of the recording medium, and
        side end walls continuous to said pair of main walls, at least one of said main walls having an opening portion for exposing a part of at least one of the surfaces of the recording medium;
        a shutter slidably mounted on the cartridge body to open and close said opening portion;
        a first label adhering portion on one of said main walls having the opening portion, said first label adhering portion having a boundary edge extending along one side edge of said one of said main walls having the opening portion; and
        a second label adhering portion on a side end wall continuous with said one side edge, said second label adhering portion being defined by structure which distinguishes said second label adhering portion from the remainder of said side end wall continuous with said one side edge, said second label adhering portion having position limit portions projecting outwardly from opposite ends thereof in directions generally parallel to said boundary edge, said second label adhering portion having a length between opposite, outward ends of said position limit portions longer than said boundary edge.

2. A disc cartridge comprising:
    a cartridge body for rotatably storing a disc-like recording medium, said cartridge body including:
        a pair of generally parallel main walls having inner surfaces respectively facing opposing surfaces of the recording medium,
        side end walls continuous to said pair of main walls, and
        a disc inlet/outlet port for removal and insertion of the recording medium, at least one of said main walls having an opening portion for exposing a part of at least one of the surfaces of the recording medium;
        a shutter slidably mounted on the cartridge body to open and close the opening portion;
        a lid member mounted on the cartridge body rotatable between a closed position wherein the lid member closes the disc inlet/outlet port and an opened position wherein the lid member opens the disc inlet/outlet port, the lid member including an end surface defining one of said side end walls of the cartridge body when said lid member is in the closed position;
        a first label adhering portion on one of said main walls having the opening portion, said first label adhering portion having a boundary edge extending along one side edge of said one of said main walls having the opening portion, said one side edge being continuous with the end surface of said lid member when said lid member is in the closed position thereof; and
        a second label adhering portion on the end surface of said lid member, said second label adhering portion including position limit portions projecting outwardly from opposite ends thereof in directions generally parallel to said boundary edge, said second label adhering portion being defined by structure which distinguishes said second label adhering portion from the remainder of said side end wall continuous with said one side edge, said second label adhering portion having a length between opposite, outward ends of said position limit portions longer than said boundary edge.

3. A disc cartridge according to claim 2 further comprising an indication label including:
    first indication portion having a shape corresponding to said first label adhering portion and being adhered to said first label adhering portion, and
    a second indication portion continuous to said first indication portion, said second indication portion having a shape corresponding to said second label adhering portion and being adhered to said second label adhering portion, said indication label being separable along a boundary line extending between said first and second indication portions when said lid member is initially opened.

4. A disc cartridge according to claim 3, wherein said cartridge body includes a label separation groove formed along said boundary edge of said first label adhering portion for separating said indication label along said boundary line.

5. A disc cartridge according to claim 3, wherein said first label adhering portion is a concave portion formed on said main wall having the opening portion and said second label adhering portion is a concave portion formed on the end surface of said lid member.

6. A disc cartridge according to claim 3, wherein the indication label has a cutting-guide line extending along the boundary between the first and second indication surfaces.

7. A disc cartridge according to claim 6, wherein the cutting-guide line comprises a plurality of pores disposed and perforated intermittently along the boundary line between the first and second indication portions.

8. A disc cartridge comprising:
    a cartridge body for rotatable storing a disc-like recording medium, the disc-like recording medium having recording surfaces on opposing surfaces thereof, said cartridge body including:
        a pair of generally parallel main walls having inner surfaces respectively facing the recording surfaces of the recording medium,
        side end walls continuous to the pair of main walls, and
        a disc inlet/outlet port for insertion and removal of the recording medium, each of said main walls having an opening portion for exposing the surfaces of the recording medium;

a shutter slidably mounted on the cartridge body to open and close the opening portions;

a lid member mounted on the cartridge body to be rotatable between a closed position wherein said lid member closes the disc inlet/outlet port and an opened position wherein said lid member opens the disc inlet/outlet port, said lid member including an end surface defining one of said side walls of said cartridge body when said lid member is in the closed position;

a first label adhering portion on each of said main walls, said first label adhering portions each having a boundary edge extending along one side edge of the main wall on which it is located, each of said side edges being continuous with the end surface of said lid member when said lid member is in the closed position thereof;

a second label adhering portion on the end surface of said lid member, said second label adhering portion having position limit portions projecting outwardly from opposite ends thereof in directions generally parallel to said boundary edges, said second label adhering portion having a length between opposite outward ends of said position limit portions longer than each of said boundary edges; and an indication label including:
a pair of first indication portions each having a shape corresponding to said first label adhering portions and being adhered to a respective one of said first label adhering portions, and
a second indication portion continuous to each of said first indication portions, said second indication portion having a shape corresponding to the second label adhering portion and being adhered to said second label adhering portion, said indication label being separable along boundary lines extending between said second indication portion and each of said first indication portions when said lid member is initially opened.

9. A disc cartridge according to claim 8, wherein the cartridge body includes label separation grooves formed along each of said boundary edges for separating the indication label along said boundary lines.

10. A disc cartridge according to claim 8, wherein said first label adhering portions are concave portions formed on each of said main walls and said second label adhering portion is a concave portion formed on the end surface of said lid member.

11. A disc cartridge according to claim 8, wherein the indication label has cutting-guide lines extending along the boundary lines extending between the first and second indication portions.

12. An indication label to be adhered onto a pair of first label adhering portions and a second label adhering portion of a cartridge for rotatably storing a disc-like recording medium, the cartridge comprising:

a pair of generally parallel main walls having inner surfaces facing opposing surfaces of the recording medium, and side end walls formed continuous with said main walls, said pair of first label adhering portions being respectively formed on each of said main walls, said pair of first label adhering portions each having a boundary edge extending along one side of the main wall on which it is located, said second label adhering portion being formed on one of said side end walls such that said second label adhering portion is continuous with each of said first label adhering portions, said indication label comprising:
a pair of first indication portions respectively having shapes corresponding to said first label adhering portions and being adherable on said first label adhering portions; and
a second indication portion having a shape corresponding to the second label adhering portion and being adherable to the second label adhering portion, said second indication portion being continuous to said first indication portions along said boundary edges, said second indication portion having position limit portions projecting outwardly from opposite sides thereof in directions generally parallel to said boundary edges, said second indication portion having a length between opposite, outward ends of said position limit portions longer than the length of each of said boundary edges.

13. An indication label according to claim 12, further comprising cutting-guide lines extending along the boundary edges.

14. An indication label according to claim 13, wherein each of the cutting-guide lines comprises by a plurality of pores disposed and perforated intermittently along the boundary edges.

15. An indication label to be adhered onto a pair of first label adhering portions and a second label adhering portion of a cartridge for rotatably storing a disc-like recording medium, the cartridge comprising:

a pair of generally parallel main walls having inner surfaces facing opposing surfaces of the recording medium, and side end walls formed continuous with said main walls, said pair of first label adhering portions being respectively formed on each of said main walls, said second label adhering portion being formed on one of said side end walls such that said second label adhering portion is continuous with each of said first label adhering portions, said indication label comprising:
a pair of first indication portions respectively having shapes corresponding to said first label adhering portions and being adherable on said first label adhering portions;
a second indication portion having a shape corresponding to the second label adhering portion and being adherable to the second label adhering portion, said second indication portion being continuous to said first indication portions along a pair of boundary lines, said second indication portion having position limit portions projecting outwardly from opposite sides thereof in directions generally parallel to said boundary lines, said second indication portion having a length between opposite, outward ends of said position limit portions longer than the length of each of said boundary lines; and
cutting-guide lines extending along the boundary lines between the first and second indication portions.

16. An indication label according to claim 15, wherein each of the cutting-guide lines comprises by a plurality of pores disposed and perforated intermittently along the boundary lines.

* * * * *